June 11, 1968        J. MacKEW        3,387,615
DENTAL FLOSS HOLDER
Filed March 25, 1965
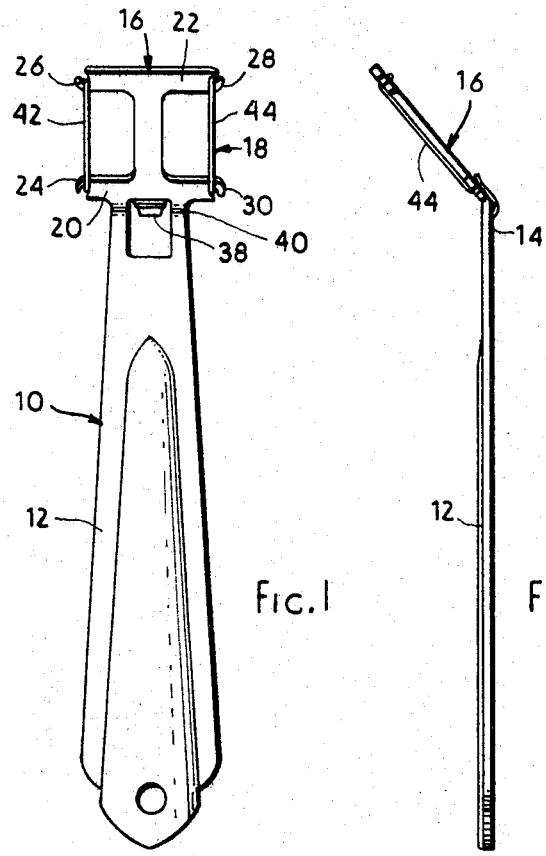
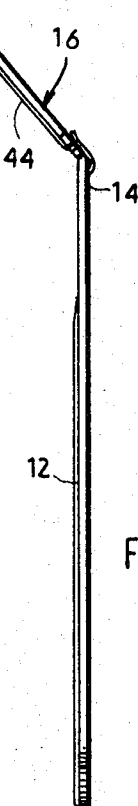
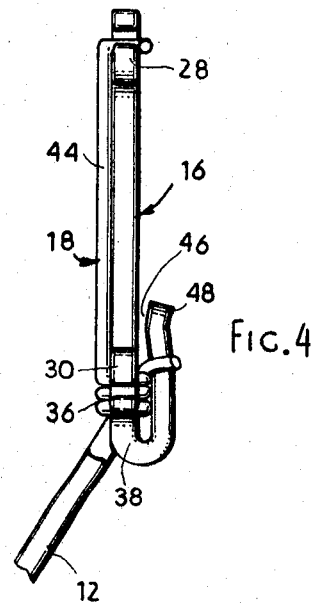
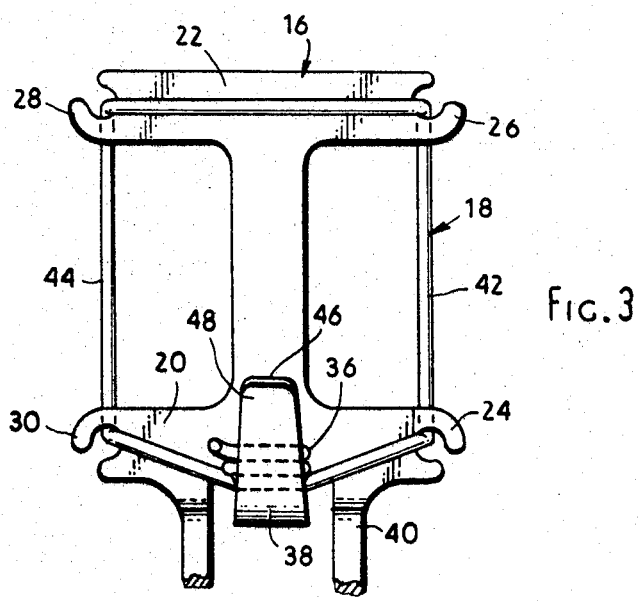
INVENTOR
JAMES MAC KEW
by Albert L. Jeffers
ATTORNEY

United States Patent Office 3,387,615
Patented June 11, 1968

3,387,615
DENTAL FLOSS HOLDER
James MacKew, 5005 Industrial Drive,
Fort Wayne, Ind. 46805
Filed Mar. 25, 1965, Ser. No. 442,720
1 Claim. (Cl. 132—91)

ABSTRACT OF THE DISCLOSURE

A dental floss holder which has an I-shaped frame having arms with hooks disposed at each end thereof for supporting two separate sections of dental floss, and a clip formed in the handle of the holder for providing an anchor for each end of the dental floss.

This invention relates to a dental floss holder, and more particularly, to a dental floss holder that will support therethrough a length of dental floss with sufficient tension to facilitate the removal of food particles and for cleaning the spaces between teeth and for the general improvement of dental hygiene.

Many dental floss holders have been proposed in the past and there was an attempt in each of them to provide structure wherein the dental floss can be easily strung and replaced and held taut during the tooth cleaning operation.

Most of the previous dental floss holders have failed, however, for a variety of reasons, to gain substantial acceptance; sometimes because of the difficulty in stringing dental floss to maintain sufficient tension to insert between the teeth; sometimes because of the difficulty in replacing the dental floss sections, and at still other times, because they were too expensive to construct or too cumbersome to use.

Accordingly, it is one of the principal objects of the present invention to provide a new and improved dental floss holder which is inexpensive to produce and which can easily be strung with a length of dental floss for dental usage.

It is a further object of the present invention to provide a tool in the form of a novel dental floss holder in which the dental floss is readily mounted by means of a rack having a combination horn and spring cap which is formed as a struck portion of the tool and is adapted to securely hold the ends of the dental floss during use.

It is a further object of the present invention to provide an inexpensive dental floss holder which can be readily manufactured from a stamping, so that the construction is readily producible but at the same time the resulting product possesses a durability and rigidity sufficient to hold the dental floss taut while it is being used. Related to the same object, is that of providing a dental floss holder which will not readily tarnish or corrode when subjected to oral usage.

It is another object of the present invention to provide a new and useful tool adapted for dental floss usage in which the dental floss can be readily strung and easily removed but during usage is securely held.

Other objects and features of the present invention will become apparent from a consideration of the following description, which proceeds with reference to the accompanying drawings, wherein:

FIGURE 1 is a top view of the dental floss holder;

FIGURE 2 is a side view, looking from the right hand side of FIGURE 1;

FIGURE 3 is an enlarged detailed view of the floss mounting structure, viewed from the rear thereof; and, FIGURE 4 is an enlarged detail view of the mounting structure viewed from the upper right hand end of FIGURE 1.

Referring now to the drawings, the dental floss holder designated generally by reference numeral 10 includes a handle 12 of hardened stainless steel which is tapered to facilitate gripping. The material, of course, can be of any suitable composition and need not necessarily be of stainless steel but may be fabricated from other sheet metals and plated to resist corrosion or tarnish.

In any event, however, it is desired that the material be of such composition as to be resistant to corrosion or tarnish, since the product is used in oral hygiene and therefore is exposed to oral tissue and oral fluids which are known to be quite corrosive. The product can be made from a metal stamping and is therefore manufacturable at a relatively low cost.

At the end of 14 of the handle 12 is an inclined head 16 which serves as a mounting frame for a length of dental floss 18 strung around the perimeter of the head 16 which is of I-shape. The projecting arms 20 and 22 of the frame have hooks 24, 26, 28, and 30 at the ends thereon, and the hooks open oppositely to each other on the respective arms 20 and 22. Thus, referring to FIGURE 1, hooks 24 and 30 open downwardly and hooks 26 and 28 open upwardly so that as the dental floss is strung through the hooks under tension the dental floss is drawn against the bottom portions of the hooks.

The dental floss is strung by first making several turns 36 around a horn 38 which is struck from the handle 12 at the neck 40 between the handle 12 and head 16 and after being anchored to the horn the dental floss is then strung through hook 24, then to hook 26 to provide a span 42; the floss then crosses the top of head 16 between hook 26 and hook 28; then to hook 30 to provide a second span 44 and the end is then slipped under the horn 38 and through a slot 46 two or more times. The slot 46 is of slightly less dimension than the diameter of the dental floss to form a snap fit with the dental floss which is consequently securely anchored thereto. To provide the slot 46, the end 48 of the horn is bent backwardly (FIGURE 4) upon itself and pressed toward the head or frame 16. The end 48 is resilient so that the end of the dental floss can be drawn past the slot 46, springing the end 48 away from the head 16 and forming a spring lock on the turns of winding of the dental floss.

Thus, the ends of the dental floss are held securely and the entire strung length of the dental floss is retained under tension so that the two spans 42 and 44 are relatively taut and are well adapted to serve the functions of cleaning the spaces between the teeth or removal of lodged food particles.

To replace the length of dental floss it is only necessary to grasp the exposed end of the dental floss and draw it back through the slot 46, unwinding its connection with the horn 38 and unstringing the dental floss from the hooks 30, 28, 26, and 24 and unwrapping the coils 36. The dental floss can then be replaced with a new section, anchoring and stringing it as previously described.

The method of constructing the product horn 38 is struck from the neck 40 and at the same time a portion is blanked from the neck surrounding the struck portion. The end 48 is then bent backwardly to provide the anchor for the ends of the dental floss. At the same time, the head or frame 16 is bent about 30 degrees from the plane of the handle 12 (FIGURE 2) and at this angle, it is easier to perform the various cleaning operations within the mouth. It is, of course, possible to bend the head 16 to any preferred angle but it has been found that a bend of approximately 30 degrees or so is preferred.

It has been further found that with the use of a handy one-piece inexpensive tool of the kind described, dental floss can be made to be much more effective and can reach more inaccessible places within the mouth than would be possible by using fingers or holders for the floss in cleaning teeth.

In operation, the dental floss is first wrapped over the horn and is next strung over the hooks 24, 26, 28, 30 and then back to the horn; spans 42 and 44 will remain taut, and when the dental floss is forced between the teeth and into the crevices of the teeth the tool, which is in the position shown in FIGURE 2, resists bending. Consequently, the tool, in spite of being lightweight and small is nevertheless rigid so that it will not readily bend or break in use.

Although the present invention has been illustrated and described in connection with a single example embodiment, it will be understood that this is illustrative of the invention and is by no means restrictive thereof. It is reasonably to be expected those skilled in the art can make numerous revisions and adaptations of the invention and it is intended that such revisions and adaptations will be included within the scope of the following claim as equivalents of the invention.

I claim:
1. A dental floss holder comprising:
   (a) a handle adapted for grasping and having an I-shaped frame section disposed at one end, said frame inclined at substantially 30 degrees with respect to the plane of said handle,
   (b) said frame including spaced upper and lower arms provided with hooks at each end thereof, said hooks being disposed to provide a rectangular outline and receiving a length of dental floss which is strung about said hooks to provide two spans of dental floss for operative usage,
   (c) said hooks on the upper arm provided with openings disposed upwardly and outwardly and said hooks on the lower arm provided with openings disposed downwardly and outwardly,
   (d) a resilient tongue section formed from a struck portion between the handle and frame and providing an anchor about which one end of the floss is wrapped, said tongue section being bent back to form a slot of narrow dimension to form a restriction which serves to bind the other end of the floss when it is forced past said restriction between said bent back tongue and said handle.

References Cited
UNITED STATES PATENTS

| 893,345 | 7/1908 | Monson | 132—91 |
| 2,059,287 | 11/1936 | Storm | 132—91 |
| 2,664,093 | 12/1953 | Carpenter | 132—91 |

LOUIS G. MANCENE, *Primary Examiner.*

G. E. McNEILL, *Assistant Examiner.*

UNITED STATES PATENT OFFICE

CERTIFICATE OF CORRECTION

Patent No. 3,387,615 June 11, 1968

James MacKew

It is certified that error appears in the above identified patent and that said Letters Patent are hereby corrected as shown below:

Column 4, after line 24, insert the following references:

| | | | |
|---|---|---|---|
| 1,442,380 | 1/1923 | Ball | 132-92 |
| 1,955,428 | 4/1934 | Ludwig | 132-92 |
| 2,117,844 | 5/1938 | Grieco | 132-92 |
| | | FOREIGN PATENT | |
| 450,928 | 7/1939 | Great Britain | |

Signed and sealed this 2nd day of December 1969.

(SEAL)
Attest:

Edward M. Fletcher, Jr.
Attesting Officer

WILLIAM E. SCHUYLER, JR.
Commissioner of Patents